US011123873B2

(12) United States Patent
Park

(10) Patent No.: US 11,123,873 B2
(45) Date of Patent: Sep. 21, 2021

(54) METHOD AND SERVER FOR CONTROLLING INTERACTION ROBOT

(71) Applicant: Circulus Inc., Seoul (KR)

(72) Inventor: Jong Gun Park, Seoul (KR)

(73) Assignee: CIRCULUS INC., Seoul (KR)

( * ) Notice: Subject to any disclaimer, the term of this patent is extended or adjusted under 35 U.S.C. 154(b) by 468 days.

(21) Appl. No.: 16/192,127

(22) Filed: Nov. 15, 2018

(65) Prior Publication Data

US 2020/0047348 A1 Feb. 13, 2020

(30) Foreign Application Priority Data

Aug. 7, 2018 (KR) .................. 10-2018-0091669

(51) Int. Cl.
| | | |
|---|---|---|
| *B25J 11/00* | (2006.01) | |
| *G10L 25/63* | (2013.01) | |
| *G06F 3/01* | (2006.01) | |
| *G06K 9/00* | (2006.01) | |
| *G06F 3/16* | (2006.01) | |
| *G06F 40/30* | (2020.01) | |
| *G10L 15/26* | (2006.01) | |

(52) U.S. Cl.
CPC .......... *B25J 11/001* (2013.01); *B25J 11/0015* (2013.01); *G06F 3/017* (2013.01); *G06F 3/167* (2013.01); *G06F 40/30* (2020.01); *G06K 9/00302* (2013.01); *G10L 15/26* (2013.01); *G10L 25/63* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0198626 A1* | 12/2002 | Imai | ....................... | G06N 3/008 |
| | | | | 700/245 |
| 2006/0143006 A1* | 6/2006 | Asano | ..................... | G10L 15/20 |
| | | | | 704/238 |
| 2007/0270074 A1* | 11/2007 | Aochi | .................... | A63H 11/00 |
| | | | | 446/175 |
| 2015/0217449 A1* | 8/2015 | Meier | .................. | G05B 13/027 |
| | | | | 700/257 |

(Continued)

FOREIGN PATENT DOCUMENTS

| | | |
|---|---|---|
| KR | 100814330 B1 | 3/2008 |
| KR | 1020120121298 A | 11/2012 |
| KR | 1020130093290 A | 8/2013 |

(Continued)

*Primary Examiner* — Phung-Hoang J Nguyen
(74) *Attorney, Agent, or Firm* — STIP Law Group, LLC

(57) ABSTRACT

A control method of an interaction robot according to an embodiment of the present invention comprises the steps of: receiving a user input, by the interaction robot; determining a robot response corresponding to the received user input, by the interaction robot; and outputting the determined robot response, by the interaction robot, wherein the step of outputting the determined robot response includes the steps of: outputting a color matching to the received user input or the determined robot response to a light emitting unit, by the interaction robot; and outputting a motion matching to the received user input or the determined robot response to any one or more among a first driving unit and a second driving unit, by the interaction robot.

8 Claims, 11 Drawing Sheets

(56) References Cited

U.S. PATENT DOCUMENTS

2018/0329560 A1* 11/2018 Kim .................... G06F 21/6218
2019/0342243 A1* 11/2019 Lee .................... G06K 9/00288

FOREIGN PATENT DOCUMENTS

| KR | 20170055040 | * | 5/2017 |
| KR | 1020180040907 A | | 4/2018 |
| KR | 1020180057489 A | | 5/2018 |
| KR | 1020180079825 A | | 7/2018 |

* cited by examiner

[Fig. 1]
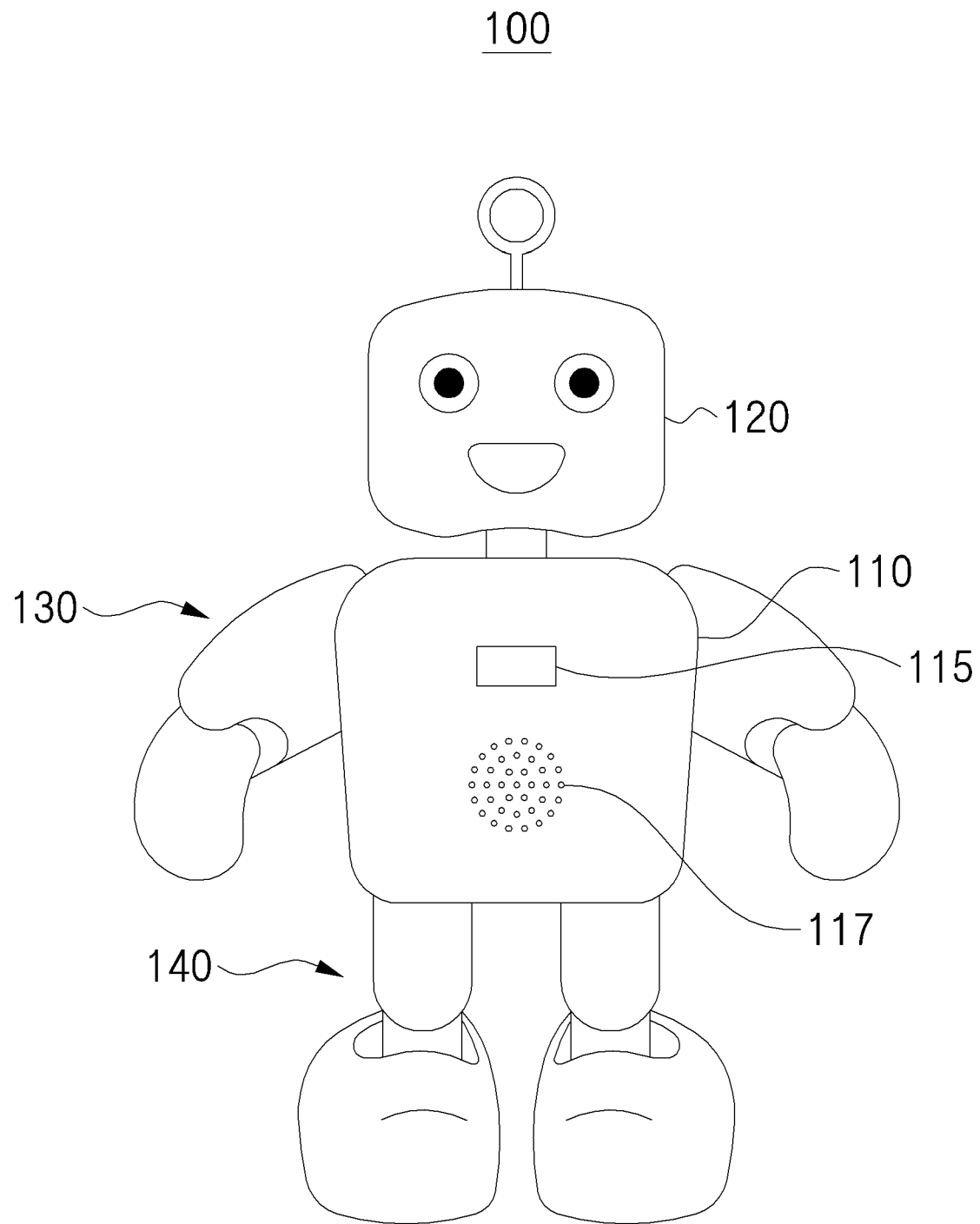

[Fig. 2]
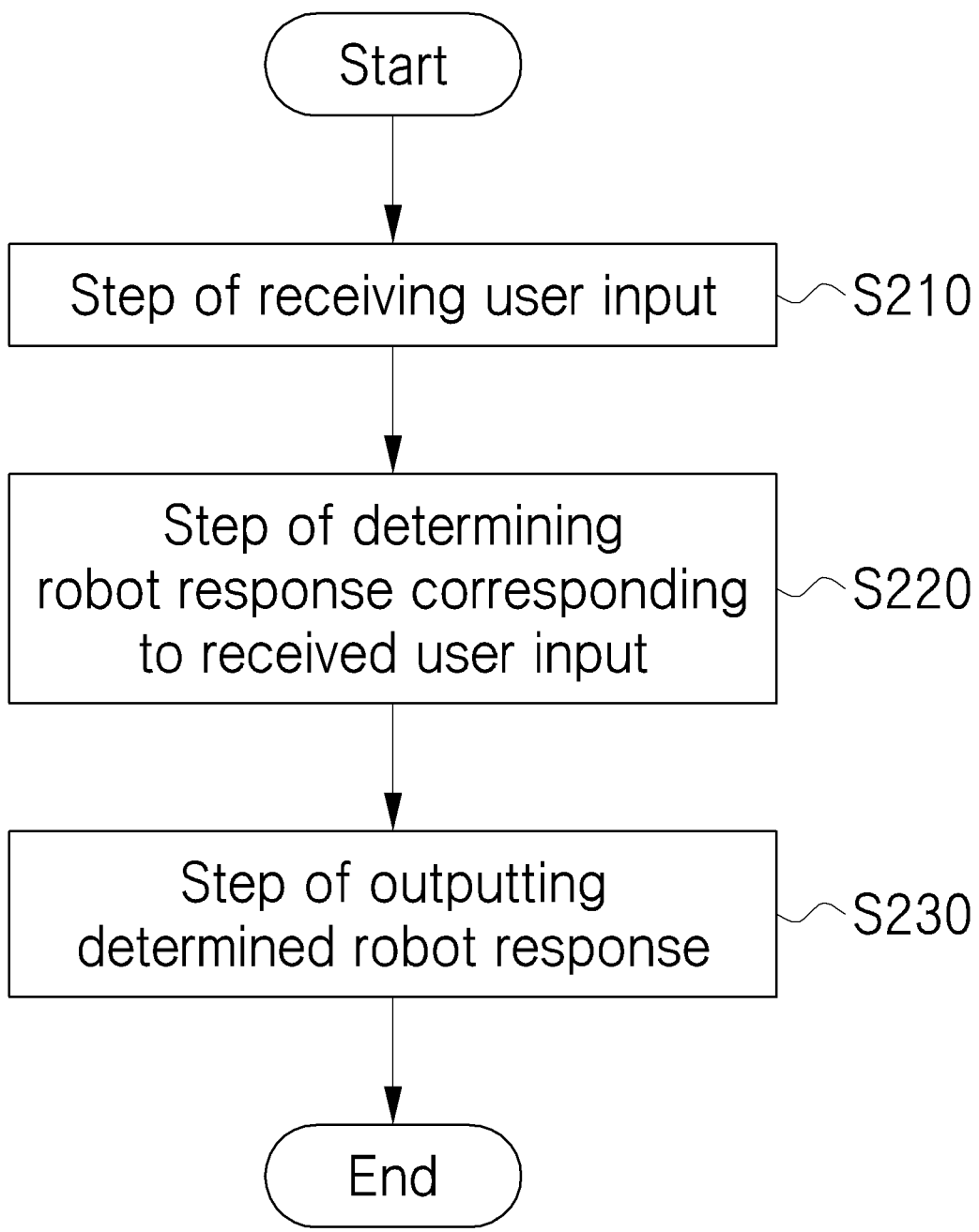

[Fig. 3]
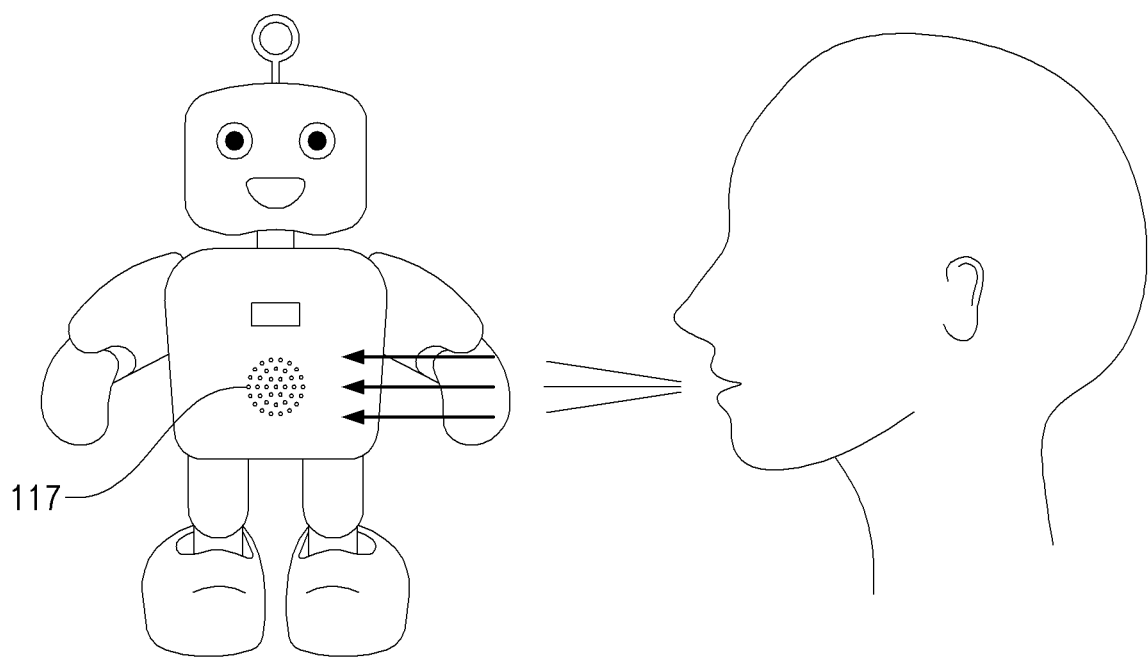

[Fig. 4]
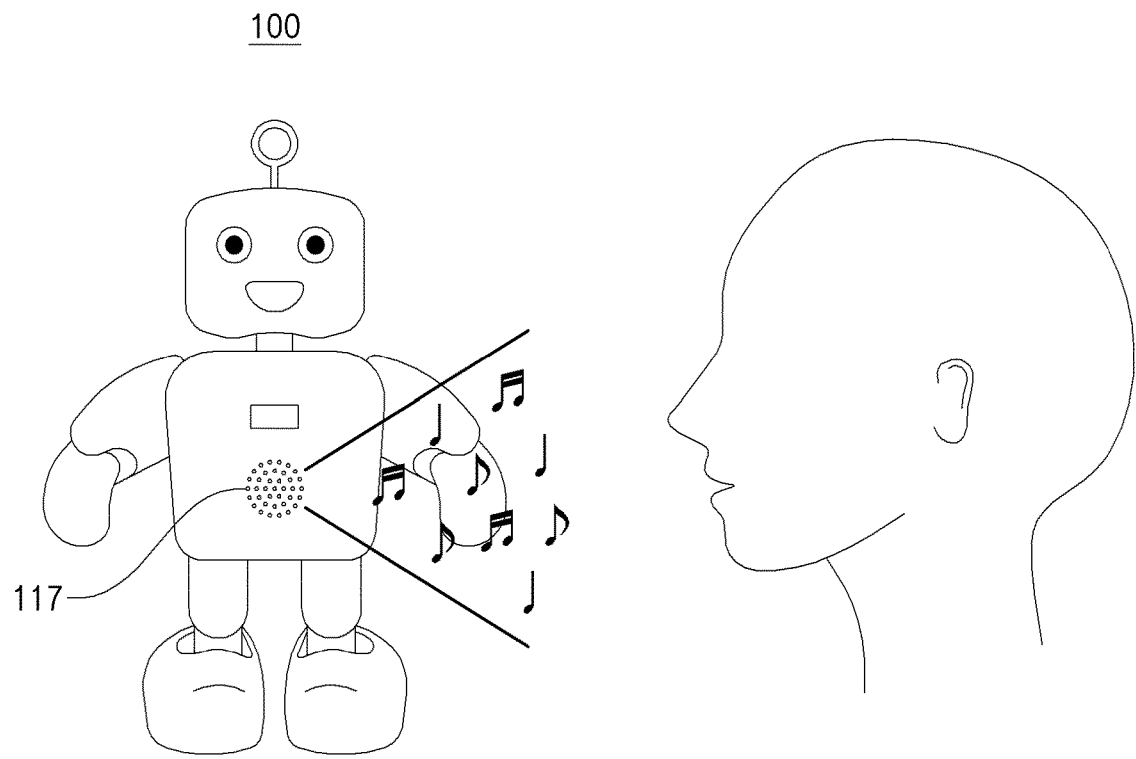

[Fig. 5]
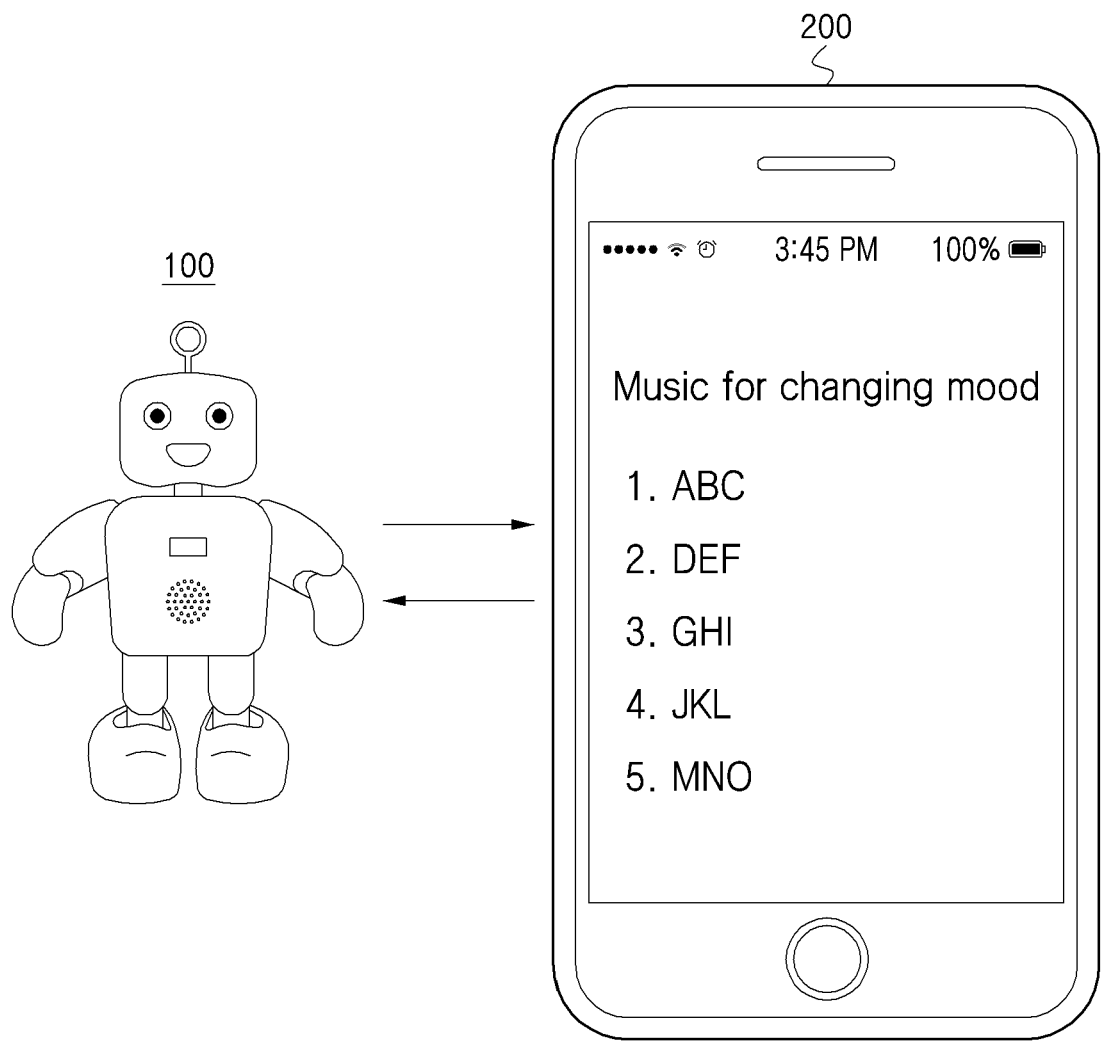

[Fig. 6]
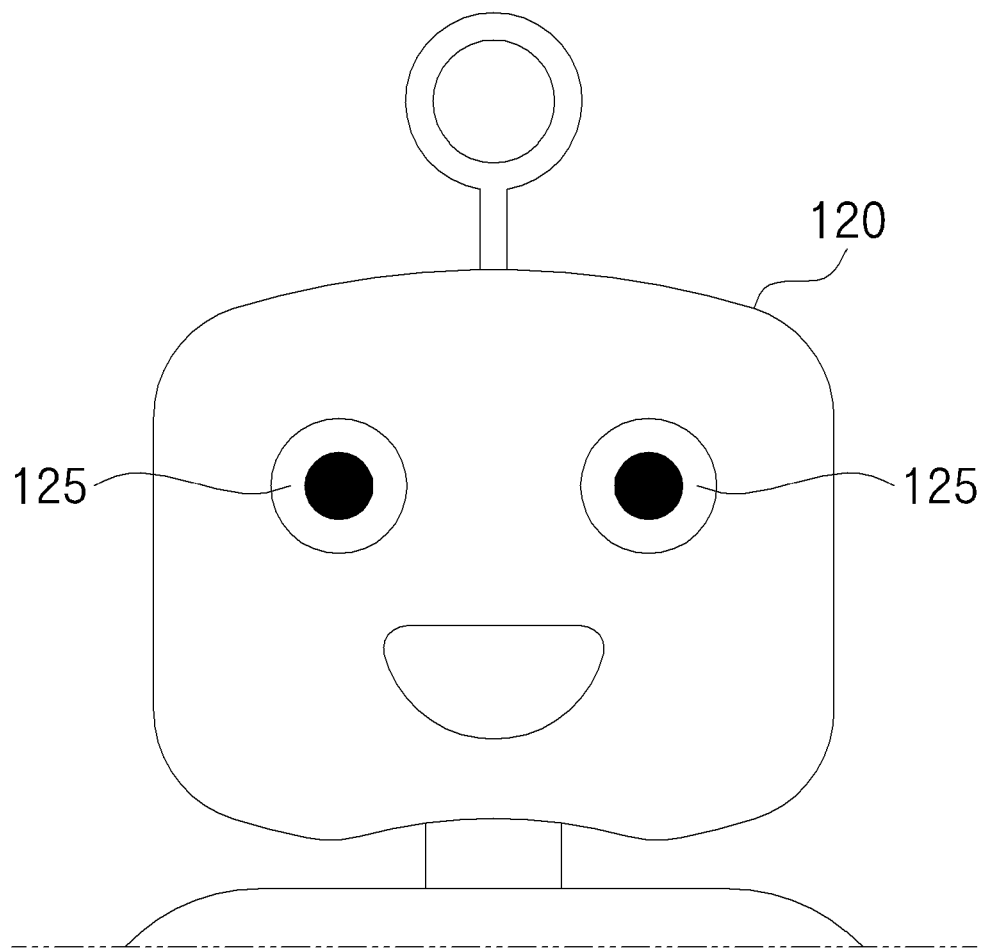

[Fig. 7]
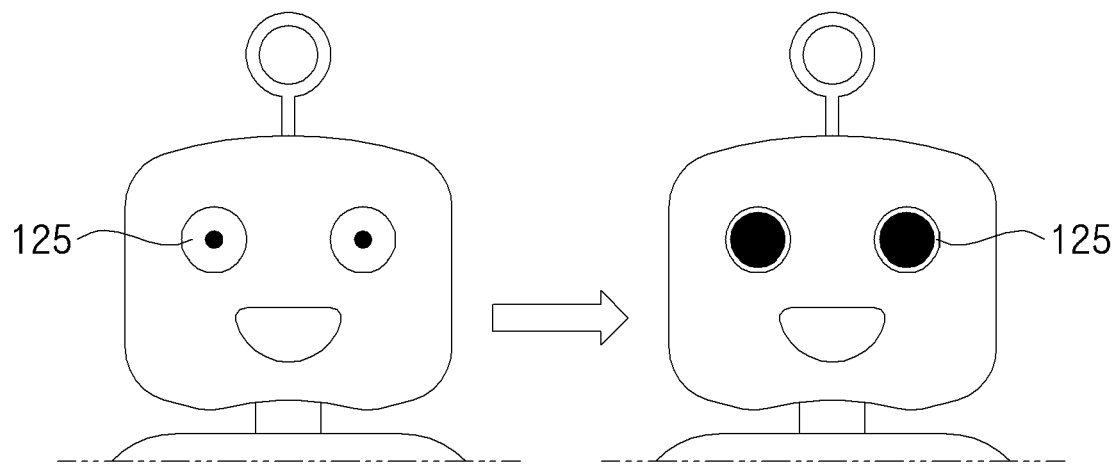

[Fig. 8]
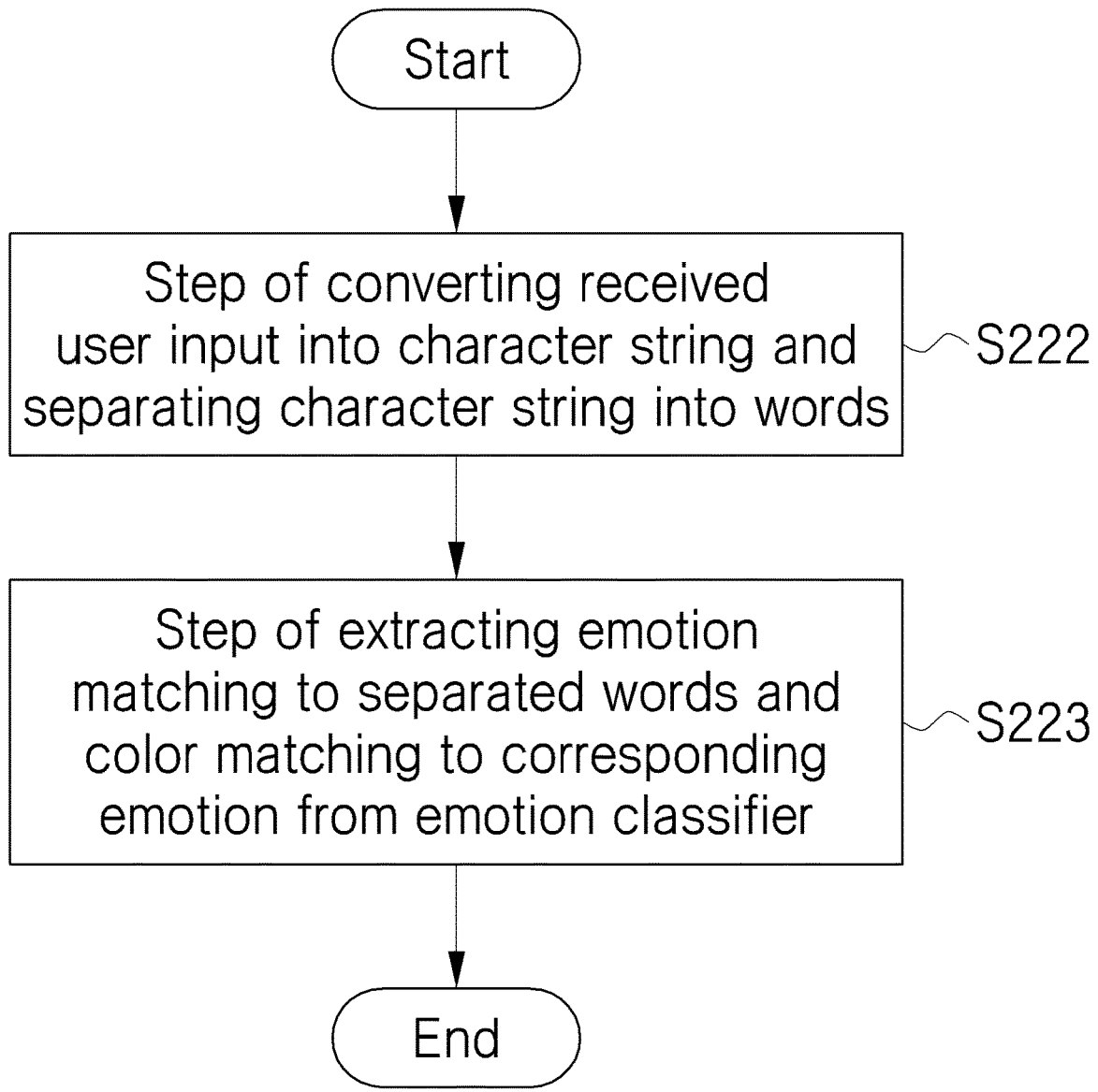

| Emotion / Intensity | Joy | Sorrow | Anger | Disgust | Fear |
|---|---|---|---|---|---|
| Weak | Yellow 1 | Blue 1 | Red 1 | Green 1 | Purple 1 |
| Intermediate | Yellow 2 | Blue 2 | Red 2 | Green 2 | Purple 2 |
| Strong | Yellow 3 | Blue 3 | Red 3 | Green 3 | Purple 3 |

[Fig. 10]
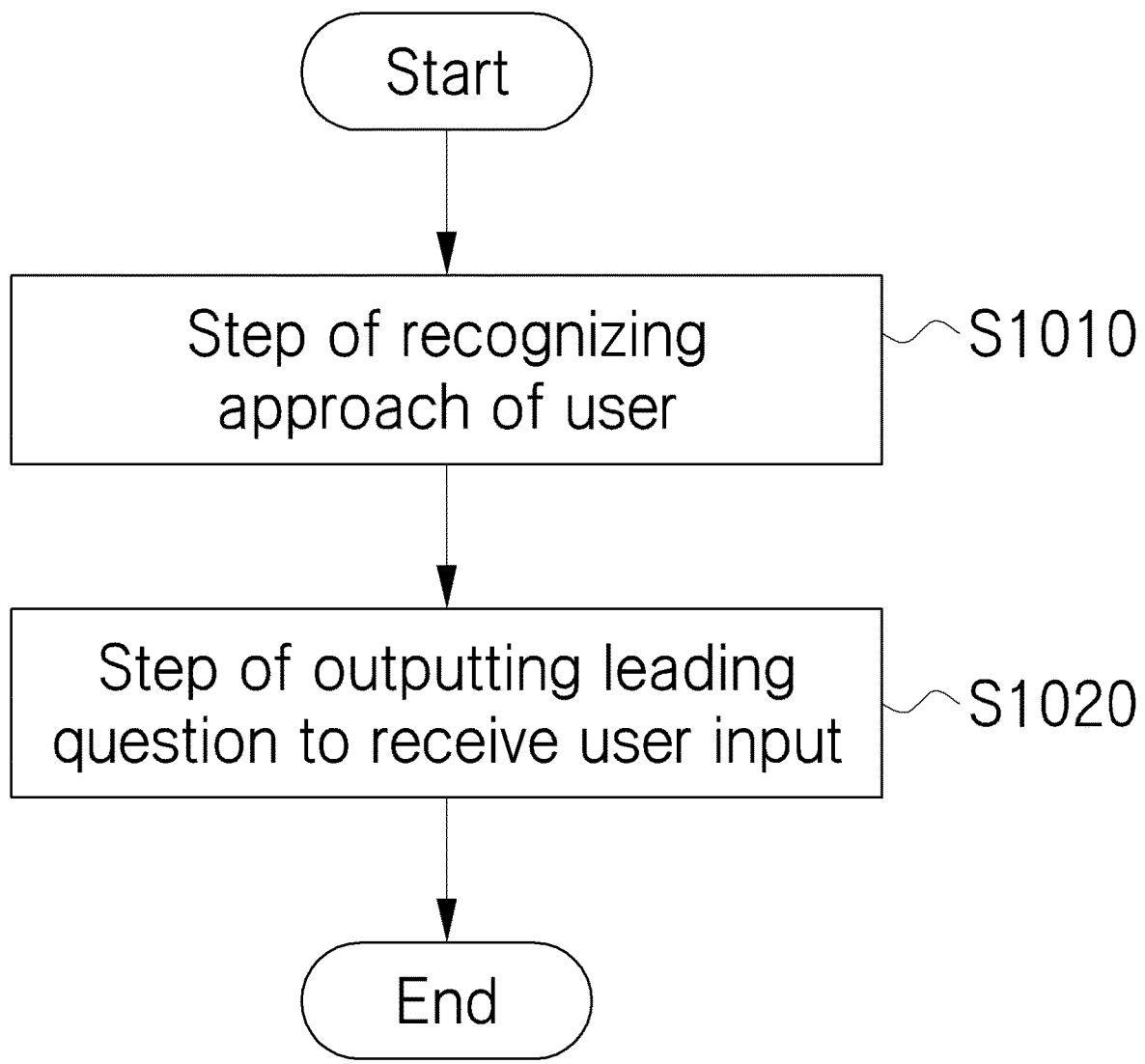

[Fig. 11]
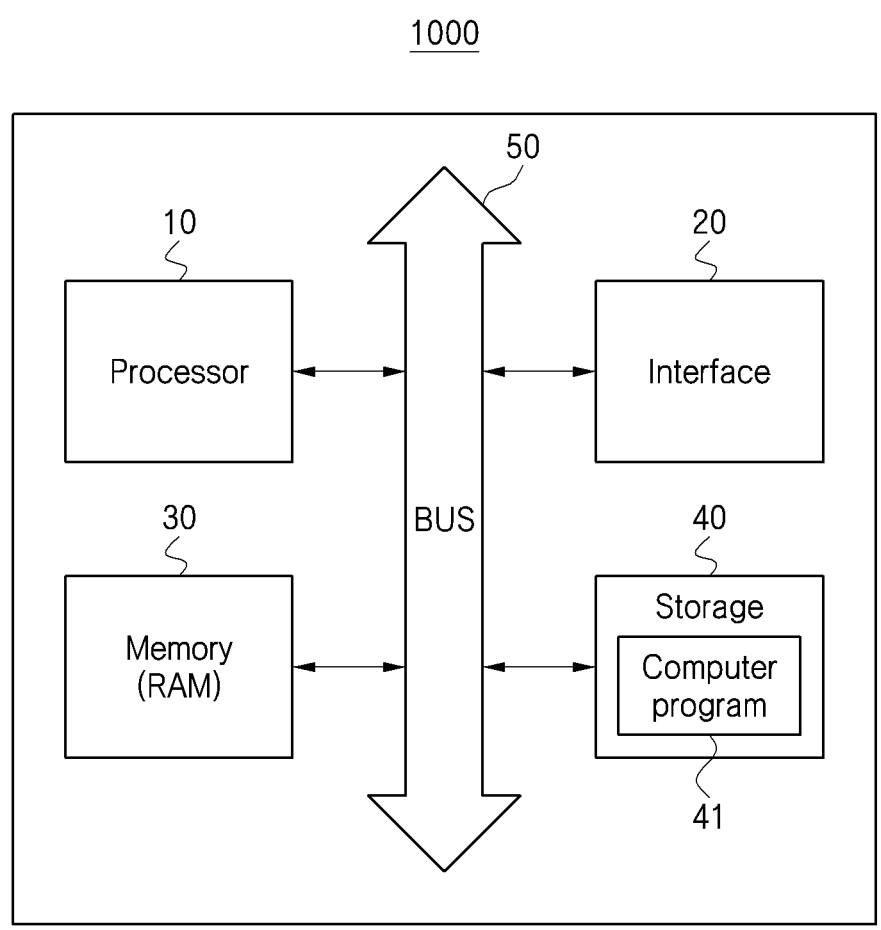

METHOD AND SERVER FOR CONTROLLING INTERACTION ROBOT

CROSS REFERENCE TO RELATED APPLICATION

The present application claims the benefit of Korean Patent Application No. 10-2018-0091669 filed in the Korean Intellectual Property Office on Aug. 7, 2018, the entire contents of which are incorporated herein by reference.

BACKGROUND OF THE INVENTION

Field of the Invention

The present invention relates to a method and a server for controlling an interactive robot, and more specifically, to a method and a server for controlling an interactive robot which realizes and visually outputs an emotion of a user and intensity of the emotion by itself.

Background of the Related Art

Recently, development of a robot is not just development of a mechanical computing device as before, but its goal is redirected to development of a pet robot closely related to and deeply penetrated into human lives. Such a pet robot is called as an interactive robot as it interacts with human beings.

However, since most of the interactions performed by the interaction robots currently on the market are passive actions of receiving an input from a user and outputting a response according thereto, it is difficult to consider the interactions as interactions of real meaning for making an emotional communication, and it is reasonable to see the robots as a simple computing device.

Therefore, recent development of an interaction robot sets a primary object of implementing interactions of real meaning, which can provide a service optimized through emotional communication with human beings. Here, the emotional communication should be approached from the aspect of meeting psychological satisfaction in that the robot is like a real friend, more specifically, from the viewpoint of a human being using the interaction robot, the robot fully understands me, as well as being able to accurately grasp and sympathize with my emotional state.

However, setting aside the fact that the interaction robot interacts with a human being, since the interaction robot itself is a thing that cannot have an emotion of its own and corresponds to a computing device, the problem is that how the psychological satisfaction of a human being can be met. The present invention has been proposed to solve this problem.

SUMMARY OF THE INVENTION

Therefore, the present invention has been made in view of the above problems, and it is an object of the present invention to provide a method and a server for controlling an interaction robot which can accurately grasp and sympathize with the emotional state of a human being, who is a user of the interaction robot.

Another object of the present invention to provide a method and a server for controlling an interaction robot which can provide a psychological satisfaction like a real friend in that the robot fully understands a human being, who is a user of the interaction robot.

Another object of the present invention to provide a method and a server for controlling an interaction robot which is not limited to passive actions, but is capable of friendly approaching a human being, who is a user of the interaction robot, and making an emotional communication.

The technical problems of the present invention are not limited to those mentioned above, and unmentioned other technical problems maybe clearly understood by those skilled in the art from the following descriptions.

To accomplish the above objects, according to one aspect of the present invention, there is provided a control method of an interaction robot, the method comprising the steps of: receiving a user input, by the interaction robot; determining a robot response corresponding to the received user input, by the interaction robot; and outputting the determined robot response, by the interaction robot, wherein the step of outputting the determined robot response includes the steps of: outputting a color matching to the received user input or the determined robot response to a light emitting unit, by the interaction robot; and outputting a motion matching to the received user input or the determined robot response to any one or more among a first driving unit and a second driving unit, by the interaction robot.

According to an embodiment, the user input and the robot response may be any one or more among a voice, a gesture, a facial expression, a touch, a USB input/output and an input/output through an external device linked to the interaction robot.

According to an embodiment, the step of searching for and determining a robot response may include the steps of: converting the received user input into a character string and separating the character string into words; and extracting an emotion matching to the separated words and a color matching to the emotion from an emotion classifier.

According to an embodiment, the step of outputting the robot response includes the steps of: converting the determined robot response into a character string and separating the character string into words; and extracting an emotion matching to the separated words and a color matching to the emotion from an emotion classifier.

According to an embodiment, the emotion classifier may have a plurality words matched to an emotion and sorted in advance, periodically crawl data including a specific sentence, and match, when a word other than the plurality of words matched to an emotion is included in the crawled specific sentence, an emotion to the word on the basis of the emotion matched to the other words included in the specific sentence.

According to an embodiment, the control method may further comprise, before the step of receiving a user input, the step of performing authentication on a user, wherein the authentication on a user is performed by touching a specific part of the interaction robot as many as a preset specific number of times or by touching the interaction robot with a specific strength.

According to an embodiment, the interaction robot may operate as an Internet access point (AP) in a space where the interaction robot is arranged.

According to an embodiment, the control method may further comprise, before the step of receiving a user input, the steps of: recognizing approach of a user; and outputting a leading question to receive the user input as approach of a user is recognized.

According to an embodiment, when a plurality of interaction robots is clustered, the interaction robots may be grouped into interaction robot groups according to usage by the user, and updates may be collectively performed on or applications may be collectively installed in the grouped interaction robot groups.

To accomplish the above objects, according to another aspect of the present invention, there is provided a control server of an interaction robot, the server comprising: one or more processors; a network interface; a memory for loading a computer program performed by the processors; and a storage for storing large-scale network data and the computer program, wherein the computer program includes an operation of receiving a user input; an operation of searching for and determining a robot response corresponding to the received user input; and an operation of outputting the determined robot response, wherein the operation of outputting the robot response includes: an operation of outputting a color matching to the received user input or the determined robot response to a light emitting unit; and an operation of outputting a motion matching to the received user input or the determined robot response to any one or more among a first driving unit and a second driving unit.

According to the present invention as described above, there is an effect of accurately grasping and sympathizing with an emotional state of a human being, who is a user of the interaction robot, through implementation of an artificial intelligence technique and providing a psychological satisfaction like a real friend.

In addition, as the interaction robot can make a conversation by showing the eyes of the robot after grasping the emotional state of a user by analyzing a user input or a robot response and outputting a color matching to the emotional state to a light emitting unit formed on the outer circumference of the eyes, a feeling of actually conversing with a human being can be provided, and as a result, there is an effect of easily making an emotional communication with the user.

In addition, since the interaction robot first asks a user a leading question in a specific situation before receiving the user input, there is an effect of friendly approaching a human being, i.e., a user, and making an emotional communication.

The effects of the present invention are not limited to those mentioned above, and unmentioned other effects maybe clearly understood by those skilled in the art from the following descriptions.

BRIEF DESCRIPTION OF THE DRAWINGS

FIG. 1 is an exemplary view showing an interaction robot that is a target of a control method of an interaction robot according to an embodiment of the present invention.

FIG. 2 is a flowchart illustrating a control method of an interaction robot according to an embodiment of the present invention.

FIG. 3 is an exemplary view showing an interaction robot receiving a voice, which is a user input.

FIG. 4 is an exemplary view showing an interaction robot outputting a robot response.

FIG. 5 is an exemplary view showing an interaction robot outputting a robot response on a screen of an external device.

FIG. 6 is an exemplary view showing a first embodiment of a light emitting unit formed on the outer circumference of two eyes.

FIG. 7 an exemplary view showing a second embodiment of a light emitting unit formed on the outer circumference of two eyes.

FIG. 8 is a flowchart specifically illustrating step S220 of determining a robot response in a control method of an interaction robot according to an embodiment of the present invention.

FIG. 9 an exemplary view showing the overall structure of an emotion classifier.

FIG. 10 is a flowchart illustrating a control method of an interaction robot capable of friendly approaching a user and making an emotional communication, in a control method of an interaction robot according to an embodiment of the present invention.

FIG. 11 is a view showing the overall configuration of a control server of an interaction robot according to an embodiment of the present invention.

| DESCRIPTION OF SYMBOLS | |
|---|---|
| 10: Processor | 20: Network interface |
| 30: Memory | 40: Storage |
| 41: Computer program | 50: Data bus |
| 100: Interaction robot | 110: Body unit |
| 115: Display unit | 117: Speaker unit |
| 120: Head unit | 125: Light emitting unit |
| 130: First driving unit | 140: Second driving unit |
| 200: External device | |
| 1000: Control server of interaction robot | |

DETAILED DESCRIPTION OF THE PREFERRED EMBODIMENT

Hereafter, the preferred embodiments of the present invention will be described in detail with reference to the accompanying drawings. Advantages and features of the present invention and methods for achieving the same will be more clearly understood from the embodiments described below with reference to the accompanying drawings. However, the present invention is not limited to the following embodiments but may be implemented in various different forms. The embodiments are provided merely to complete disclosure of the present invention and to fully provide a person having ordinary skill in the field of the art to which the present invention belongs with the category of the present invention. The present invention is defined only by the category of the claims. Wherever possible, the same reference numbers will be used throughout the specification to refer to the same parts.

Unless otherwise defined, all terms (including technical or scientific terms) used in this specification may be used as meanings that can be commonly understood by those with ordinary knowledge in the field of the art to which the present invention belongs.

In addition, such terms as those defined in a generally used dictionary are not to be ideally or excessively interpreted unless clearly defined. The terms used in this specification are for the purpose of describing the embodiments and are not intended to limit the embodiments. In this specification, the singular forms include plural forms as well, unless the context clearly indicates otherwise.

Accordingly, in the specification described below, an "enterprise" includes private or public interest companies operating for profit or nonprofit business, and it will be described assuming that a "facility" includes all facilities operated by the companies.

Meanwhile, the terms "comprises" and/or "comprising" used in this specification mean that a constitutional element, a step, an operation and/or an element does not preclude the presence or addition of one or more other constitutional elements, steps, operations and/or elements.

Hereafter, the present invention will be described in more detail with reference to the accompanying drawings.

FIG. 1 is an exemplary view showing an interaction robot 100 that is a target of a control method of an interaction robot 100 according to an embodiment of the present invention.

However, this is only a preferred embodiment for accomplishing the objects of the present invention, and it is apparent that some configurations may be added or deleted as needed, and a function performed by any one configuration can be performed together with other configurations.

An interaction robot 100 according to an embodiment of the present invention may include a body unit 110, a head unit 120, a first driving unit 130 and a second driving unit 140 and may also further include additional configurations needed for driving the interaction robot 100 according to an embodiment of the present invention.

The body unit 110 is a core configuration in which major parts of the interaction robot 100 according to an embodiment of the present invention are installed inside thereof or connected to the outside of the robot and may further include a display unit 115 for outputting text of predetermined information, a speaker unit 117 for outputting voices, and a microphone unit (not shown) for receiving user's voices or ambient sounds.

The display unit 115 may be regarded as a kind of liquid crystal display device and may output text of predetermined information. Here, the predetermined information may include information on the emotional state of the interaction robot 100 and information converted to text from a voice that the interaction robot 100 outputs through the speaker unit 117 described below, as well as information on the state of the interaction robot 100 such as communication state strength information, remaining battery information, wireless Internet ON/OFF information and the like. For example, if an emotion after the interaction robot 100 makes an emotional communication with a user through an interaction is "happiness", "Current emotional state: Happiness" may be outputted on the display unit 115 as text, and if the user has set a wakeup alarm through the interaction robot 100, "Wake up at 7:00 AM" may be outputted on the display unit 115 as text.

Meanwhile, although the text outputted on the display 115 may be any one of the information described above repeatedly outputted, a plurality of pieces of information may be alternately outputted, or specific information may be set as default and outputted. For example, the state information of the interaction robot 100 such as communication state strength information, remaining battery information, wireless Internet ON/OFF information and the like may be set as text by default and continuously outputted on the top or the bottom of the display unit 115, and other kinds of information may be alternately outputted.

The speaker 117 outputs a voice. Here, the voice corresponds to auditory information among the outputs of the interaction robot 100 which desires to respond through an interaction with the user, and various types of voices may be set through an application (not shown) dedicated to the interaction robot 100 and installed in a user terminal (not shown).

For example, any one of various voices, such as a male voice, a female voice, an adult voice and a child voice, may be selected as a type of a voice outputted through the speaker unit 117, and even a language type such as Korean, English, Japanese and French may be selected.

Meanwhile, it is not that the speaker unit 117 does not perform a function of a general speaker although the speaker unit 117 outputs a voice, but the speaker unit 117 may also perform the function of a general speaker. For example, it is apparent that when the user desires to enjoy music through the interaction robot 100, it is possible to output the music through the speaker unit 117.

The microphone unit (not shown) receives user's voices or ambient sounds. Here, since the user's voices or the ambient sounds are important information treated as a user input in an interaction with the user, it is preferable that the microphone unit (not shown) is arranged in a place where an obstacle hindering reception of the user's voices or the ambient sounds does not exist. For example, if the microphone unit (not shown) is arranged on a side right behind the hole of the speaker unit 117 formed on the front side of the body unit 110 shown in FIG. 1, it may directly receive the user's voices or the ambient sounds.

Meanwhile, the microphone unit (not shown) may be formed to be integrated with the speaker unit 117, not a separate configuration independent from the speaker unit 117 as described above. In this case, it does not need to take into account the location of arranging the microphone unit (not shown) described above, and utilization of the space inside the body unit 110 will also be enhanced.

Such a microphone unit (not shown) performs a function of receiving a voice among the user inputs that will be described below. Furthermore, as the body unit 110 further includes known sensors such as a camera sensor (not shown), an infrared sensor (not shown), a pressure sensor (not shown), a touch sensor (not shown) and the like, in addition to the microphone unit (not shown), in receiving the user input, it may receive various kinds of user inputs.

Meanwhile, as the body unit 110 may further include an Internet AP module (not shown) to operate as an Internet access point (AP) inside the space where the interaction robot 100 is arranged, when the interaction robot 100 operates in the AP mode, it may inform the user of operating in the AP mode through the speaker unit 117 by outputting a notification about the current state, for example, a voice such as "Currently working in the Internet AP mode" or the like.

The head unit 120 is a configuration corresponding to the head of the interaction robot 100 according to an embodiment of the present invention and may be implemented in a variety of shapes.

For example, although it is shown in FIG. 1 that the head unit 120 of a square shape includes two eyes of a circular shape and a mouth of a half-moon shape, this is only an example, and the shape of the head unit 120 itself and the shapes of the eyes and the mouth may be implemented differently, and it is apparent that additional configurations other than the eyes and the mouth, e.g., the configurations of a nose and ears, may be implemented together.

Meanwhile, as the head unit 120 is very important from the aspect of the emotional communication made between the user and the interaction robot 100, its importance can be inferred from the conversation with a human being. When a conversation is made among human beings including family members, friends, and people in a business relation, the best way of making an emotional communication is conversing with each other seeing the eyes of a counterpart. Since this can be equally applied to the interaction robot 100, a feeling of actually conversing with a human being may be provided by implementing the two eyes that the head unit 120 of the interaction robot 100 includes to be immersed in emotion and applying a control method having peculiarity, and as a result, the emotional communication with the user can be with ease. Since this is about the light emitting unit 125, details thereof will be described below.

As the head unit 120 of a square shape shown in FIG. 1 includes a mouth of a half-moon shape, and the mouth is an organ making a sound for communication, the speaker unit 117 mentioned above in the description of the body unit 110 may be formed in the mouth of the head unit 120, not in the body unit 110. In this case, a feeling of actually conversing with a human being can be provided by implementing the mouth to move according to the voice that the speaker unit 117 outputs, and as a result, the emotional communication with the user can be with ease.

Meanwhile, as the light emitting unit 125, description of which is put off above, also can be implemented in the mouth, as well as in the eyes, details thereof will also be described below.

The first driving unit 130 and the second driving unit 140 are in charge of dynamic driving of the interaction robot 100 according to an embodiment of the present invention.

More specifically, the first driving unit 130 is in charge of the function of the arms of the interaction robot 100, and the second driving unit 140 is in charge of the function of the legs of the interaction robot 100. Both the first driving unit 130 and the second driving unit 140 contribute to easy making of emotional communication with the user, and details thereof will also be described below.

Meanwhile, although it is shown in FIG. 1 that both the first driving unit 130 and the second driving unit 140 are implemented in two pieces, this is only an example, and although a sense of reality can be given to the motions of the interaction robots 100 by implementing them in three pieces, this is only an option.

Until now, a configuration including the interaction robot 100 according to an embodiment of the present invention has been described with reference to FIG. 1. However, all of these are exemplary, and it is apparent that the configuration of the interaction robot 100 can be changed or improved to easily make emotional communication with the user.

Hereinafter, a control method of the interaction robot 100 will be described with reference to FIGS. 2 to 5 on the basis of the interaction robot 100 according to an embodiment of the present invention.

FIG. 2 is a flowchart illustrating a control method of an interaction robot 100 according to an embodiment of the present invention.

This is only a preferred embodiment in accomplishing the objects of the present invention, and some steps may be added or deleted as needed, and furthermore, it is apparent that any one step may be included in another step.

Meanwhile, although each step is performed by any one or more among the body unit 110, the display unit 115, the speaker unit 117, the microphone unit (not shown), the head unit 120, the first driving unit 130 and the second driving unit 140 that the interaction robot 100 according to an embodiment of the present invention includes, the description will be continued assuming that the steps are performed by the interaction robot 100 for the convenience of explanation.

First, the interaction robot 100 receives a user input (step S210).

Here, the user input may be any one or more among a voice, a gesture, a facial expression, a touch, a USB input/output, and an input/output through an external device 200 linked to the interaction robot 100, and this is the same for the robot response that will be described below. The user input like this may be regarded as a starting point of making an emotional communication between the user and the interaction robot 100.

Since a view of the interaction robot 100 receiving a voice as a user input is exemplarily shown in FIG. 3, the interaction robot 100 should be in a wake-up state at the moment of receiving the user input, and if the user input is received while the interaction robot 100 is in a sleep mode since it is not used for an extended period of time, it will be switched from the sleep mode to the wake-up state considering the user input as a wake-up signal.

A voice, a gesture, a facial expression and a touch among the user inputs may be received by a microphone unit (not shown), a camera sensor (not shown), a pressure sensor (not shown) and a touch sensor (not shown), and in the case of an input received through the external device 200 linked to the interaction robot 100, a separate communication module (not shown) for receiving the input is required, and the communication module (not shown) preferably relieves the limit of distance of wired communication in using the interaction robot 100 by selecting any one or more among wireless communication modules, such as a Wi-Fi module, an LTE module, a Bluetooth module, an MST module, an NFC module and the like.

Meanwhile, there is no restriction on the content of the user input. For example, when the user input is a voice, all the subjects that can be shared while actually conversing with a human being, such as an ordinary conversation, a question, a requirement, a direction and the like, can be used as the user input of the interaction robot 100. In the below description, the description will be continued using a voice of, for example, "I am blue today" as a user input.

If the user input is received, the interaction robot 100 determines a robot response corresponding to the received user input (step S220).

Here, the "corresponding" may have various meanings. More specifically, it may be an answer suggesting a solution to the user input or may be any one among a question inversely asking the user, an ordinary answer for continuing the conversation and the like.

According thereto, when the user input is a voice of "I am blue today", the robot response may be determined as "What happened? (Inversely asking the user a question) How about to change mood with lively music? (An answer suggesting a solution to the user input)".

Meanwhile, determination of the robot response is basically performed by artificial intelligence (AI) and may be performed by any one or more among an artificial intelligence processor (not shown) embedded in the interaction robot 100 itself and an artificial intelligence processing unit (not shown) of a central server (not shown) linked to the interaction robot 100, and the artificial intelligence processor (not shown) and the artificial intelligence processing unit (not shown) of the central server (not shown) may continuously enhance performance by learning the data generated as the interaction robot 100 is used.

If the robot response is determined, the interaction robot 100 outputs the determined robot response (step S230).

Here, output of the robot response may be performed in a variety of ways, and a voice may be outputted through an output means, e.g., the speaker unit 117, provided in the interaction robot 100 itself, or the robot response may be outputted through the external device 200 linked to the interaction robot 100.

For example, if the robot response is related to the location of a restaurant, the interaction robot 100 may output a map on which the location of a corresponding restaurant is indicated on the screen of the external device 200 linked to the interaction robot 100 or may execute a navigation displaying a route from the current location to the restaurant.

Meanwhile, when the user input is a voice of "I am blue today" and the robot response is determined as "What happened? (Inversely asking the user a question) How about to change mood with lively music? (An answer suggesting a solution to the user input)", the robot response may output music for changing mood selected by itself as shown in FIG. 4, together with the output of a voice of "What happened? How about to change mood with lively music?" or may output a list of music for changing mood on the screen of the linked external device 200 as shown in FIG. 5 so that the user may select desired music.

Furthermore, as the robot response may be outputted in any one or more forms among a gesture, a facial expression and a touch, like the user input described at step S210, the gesture and the touch may be performed by the operation of the first driving unit 130 and the second driving unit 140, and the facial expression may be performed when the head unit 120 of the interaction robot 100 is implemented to express the facial expression.

Until now, a control method of the interaction robot 100 according to an embodiment of the present invention has been described with reference to FIGS. 2 to 5. The overall process is considered as receiving a user input at step S210, determining a robot response at step S220, and outputting the robot response at step S230, and on the basis of this, a control method of the interaction robot 100 will be described, in which the interaction robot 100 may accurately grasp and sympathize with the emotional state of a human being, who is a user of the interaction robot, provide a psychological satisfaction like a real friend in that the robot fully understands a human being, who is a user of the interaction robot, and friendly approach a human being, who is a user of the interaction robot, and make emotional communication with the user.

First, the light emitting unit 125 is mentioned in the description of FIG. 1 to provide a feeling of actually conversing with a human being by implementing two eyes that the head unit 120 of the interaction robot 100 includes to be immersed in emotion and applying a control method having peculiarity, and to easily make an emotional communication with the user as a result, and the light emitting unit 125 formed in the two eyes is exemplarily shown in FIG. 6.

Referring to FIG. 6, it may be confirmed that the light emitting unit 125 is formed to have a predetermined width on the outer circumference of the two eyes that the head unit 120 of the interaction robot 100 includes, and compared with a human being, the eyes of the interaction robot 100 may be considered as black pupils, and the light emitting unit 125 may be considered as the whites of the human being.

Meanwhile, it is not that the eyes and the light emitting unit 125 should be formed as a separated configuration and only the light emitting unit 125 should emit light, but that both the eyes and the light emitting unit 125 may emit light as shown in FIG. 7 by implementing them to be integrated as one display means capable of implementing graphics and, at the same time, the size of the eyes is adjusted in accordance with shrinking and expanding of the pupils to give a feeling of real eyes of a human being.

Such a light emitting unit 125 outputs a predetermined color, and this is related to the user input received at step S210 or the robot response determined at step S220. Hereinafter, this will be described in detail.

Step S230 of outputting the robot response may further include a step of outputting a color matching to the user input or the robot response received or determined by the interaction robot 100 to the light emitting unit 125 (step S235). Here, since the color outputted to the light emitting unit 125 is a color matching to the user input or the robot response received or determined by the interaction robot 100, steps S210 and S220 should be observed more closely in determining which color to output.

FIG. 8 is a flowchart specifically illustrating step S220 of determining a robot response in a control method of an interaction robot according to an embodiment of the present invention.

This is only a preferred embodiment in accomplishing the objects of the present invention, and some steps may be added or deleted as needed, and furthermore, it is apparent that any one step may be included in another step.

Meanwhile, although each step is performed by any one or more among an artificial intelligence processor (not shown) embedded in the interaction robot 100 itself and an artificial intelligence processing unit (not shown) of a central server (not shown) linked to the interaction robot 100, the description will be continued assuming that the steps are performed by the interaction robot 100 for the convenience of explanation.

First, the user input that the interaction robot 100 has received is converted into a character string, and the character string is separated into words (step S222).

Here, conversion to a character string is converting a voice into characters when the user input is a voice, and finding singularities and converting the singularities into characters when the user input is a gesture, a facial expression or a touch. For example, when the user input is a laughing facial expression, the interaction robot 100 finds singularities from the facial expression and determines as a laughing facial expression, converts the singularities into characters of "The user is happily laughing".

Meanwhile, when the user input is a voice of "I am blue today", the interaction robot 100 may convert the voice into a character string of "I am blue today" as is and separate the character string into four words of "I", "am", "blue" and "today.

Here, the character string can be separated into words using various analysis methods. For example, any one or more of publicized language analysis methods, such as a morphological analysis, a keyword analysis, a syntax analysis and the like, can be used.

When the character string is separated into words, the interaction robot 100 extracts an emotion matching to the separated words and a color matching to the corresponding emotion from an emotion classifier 50 (step S223).

Here, the emotion classifier 50 is a kind of a small database (DB) included in the artificial intelligence processor (not shown) embedded in the interaction robot 100 itself or the artificial intelligence processing unit (not shown) of a central server (not shown) linked to the interaction robot 100, and more specifically, it can be considered as an emotion data dictionary in which emotions matching to words and colors matching to corresponding emotions are sorted in advance.

The overall structure of the emotion classifier 50 is exemplarily shown in FIG. 9, and the emotion classifier may express total fifteen emotional states by expressing intensity of emotions in three levels of weak, intermediate and strong on the basis of five basic human emotions of joy, sorrow, anger, disgust and fear. However, these emotion types and emotion strengths are examples, and it is apparent that the design of the types and the strengths of emotions may be diversely changed according to circumstances.

Meanwhile, among the five basic emotions, the joy is matching to yellow, the sorrow is matching to blue, the anger is matching to red, the disgust is matching to green, and the fear is matching to purple, and standard yellow, blue, red, green and purple of the RGB color table are basically matched on the basis of the intermediate level of the intensity of emotion. Based on basic matching, when intensity of an emotion is weak, it is matched to a color lighter than the standard yellow, blue, red, green and purple of the RGB color table, and when intensity of an emotion is strong, it is matched to a color darker than the standard yellow, blue, red, green and purple of the RGB color table. For example, in the case of red color, the intermediate intensity of emotion may be matched to (255, 0, 0), the weak intensity of emotion may be matched to (255, 198, 198), and the strong intensity of emotion may be matched to (75, 0, 0).

Although the types and the strengths of emotions are sorted in the emotion classifier 50 as described above, if information on matching between the words and the emotions is not sorted together, a color matching to a word cannot be extracted. This is related to the artificial intelligence processor (not shown) embedded in the interaction robot 100 itself or the artificial intelligence processing unit (not shown) of a central server (not shown) linked to the interaction robot 100, and hereinafter, it will be described on the basis of the artificial intelligence processor (not shown) embedded in the interaction robot 100 itself.

Initially, various words and emotions matching to corresponding words are previously sorted in the emotion classifier 50, and this is set in advance by the manufacturer of the interaction robot 100. However, when the previously set words and emotions matching thereto are changed later or when a new word and an emotion matching thereto are added, there is a problem of how to perform these works.

To solve this problem, the artificial intelligence processor (not shown) periodically surfs the Internet and crawls data. Here, the target of crawling includes sentences including a corresponding word and paragraphs including a corresponding sentence, as well as simply including independent words, and a crawling location is also not limited at all. For example, the artificial intelligence processor (not shown) may crawl data from any one among Internet portal pages, movie rating pages, book rating pages, online shopping mall goods rating pages, news article pages, various hobby group bulletin board pages, academic bulletin board pages and the like.

The data acquired through the crawling may determine a matching emotion through analysis by the unit of sentence. For example, when a sentence of "Movie xxx (Movie title) is very interesting" is acquired, an emotion the same as an emotion previously matched to "interesting" or the like included in a corresponding sentence may be matched to the xxx (Movie title). In this case, since the emotion matching to "interesting" is joy, the emotion of "joy" may be matched to the xxx (Movie title), and intensity of the emotion may be set to "strong" through "very", which is another word included in the corresponding sentence.

Meanwhile, the case of emotion matching described above for the xxx (Movie title) is only an example, and conclusively determining an emotion matching to a corresponding word on the basis of one sentence may be insufficient in terms of accuracy. Therefore, the artificial intelligence processor (not shown) includes a separate emotion correction unit (not shown) in the emotion classifier 50, and the emotion correction unit (not shown) searches for sentences including the same word more than a predetermined number of times, e.g., at least five times, equally performs an emotion matching work on all the sentences, verifies a most matching emotion from a result of the emotion matching work, and determines the emotion as a final emotion matching to the corresponding word. Furthermore, the emotion correction unit (not shown) may verify intensity of an emotion matched to a word. Although it is not described in detail to avoid duplicated description, intensity of an emotion may be finally determined through a process the same as that of the emotion matching.

Until now, a specific method of determining a robot response and a method of extracting a color outputted through the light emitting unit 125 have been described with reference to FIGS. 8 and 9, and it has been described that a color outputted through the light emitting unit 125 is related to a user input or a robot response. Therefore, since extracting a color on the basis of a robot response is also the same as shown in FIGS. 8 and 9, detailed description is omitted to avoid duplicated description.

Since the light emitting unit 125 may extract and output a color matching to an emotion on the basis of a user input or a robot response like this, the user may feel that the interaction robot 100 accurately grasps and sympathizes with the emotional state of the user and also feel psychological satisfaction in that the robot fully understands the user like a real friend. In addition, since the light emitting unit 125 is formed on the outer circumference of the eyes of the interaction robot 100, the user will concentrate on the eyes of the interaction robot 100 during the interaction process, and the emotional communication can be made more easily. Furthermore, the speed or tone of a voice may be changed according to the emotional state while the robot response is outputted. For example, a voice of high tone may be outputted in an emotional state of joy or anger, a voice of low tone in an emotional state of sorrow or fear, a voice of high speed in an emotional state of anger, and a voice of low speed in an emotional state of sorrow or disgust. Since a step of outputting a motion matching to the received user input or the determined robot response by the first driving unit 130 and the second driving unit 140 (step S237) is further included, in addition to output of a color through the light emitting unit 125, a sense of reality can be given to the conversion.

Hereinafter, a control method of the interaction robot 100 which can friendly approach a human being, i.e., a user, and make emotional communication with the user will be described.

FIG. 10 is a flowchart illustrating a control method of an interaction robot 100 capable of friendly approaching a user and making an emotional communication, in a control method of an interaction robot 100 according to an embodiment of the present invention.

This is only a preferred embodiment in accomplishing the objects of the present invention, and some steps may be added or deleted as needed, and furthermore, it is apparent that any one step may be included in another step.

Meanwhile, since the interaction robot 100 approaches a user first, the control method is assumed to be performed before step S210 of receiving a user input.

First, the interaction robot 100 recognizes approach of a user (step S1010).

Here, recognizing approach of a user means that the interaction robot 100 recognizes a user entering within a predetermined radius from the interaction robot 100 through an infrared sensor (not shown) or the like while the interaction robot 100 is in a wake-up state or a sleep mode, and if approach of a user is recognized while the interaction robot 100 is in the sleep mode, the interaction robot 100 is activated from the sleep mode to the wake-up state.

If approach of a user is recognized, a leading question is outputted to receive a user input (step S1020).

Here, the leading question is created on the basis of history of using the interaction robot 100, and it is a broad concept including all that can be outputted through the interaction robot 100, as well as a general question.

Meanwhile, creating a leading question on the basis of history of using the interaction robot 100 is creation of, for example, a welcome greeting when approach of a user is recognized for the first time after the date is changed, a sound effect for inducing a user input when any user input is not received although approach of a user is recognized three times or more on the same date, an inquiry of whether the robot response outputted last is beneficiary when any user input is not received although approach of a user is recognized five times or more regardless of date, an inquiry of whether or not to repeatedly perform a corresponding behavior when the robot response is a request for a specific behavior, an output of a sound of crying or grieving when any user input is not received for twenty-four hours or more while the power is turned on, or a welcome greeting or a request asking for frequent use when the power is turned on after being turned off for an extended period of time.

Furthermore, if the interaction robot 100 receives a user input from the user within a predetermined time after such a leading question is outputted, a voice saying appreciation for using may be outputted.

Since it is not that a user input is passively received from a user, but a leading questing is outputted to actively receive the user input from the user, the interaction robot 100 may friendly approach a human being, i.e., a user, and make emotional communication, and since data about using the interaction robot 100 can be accumulated as quickly, the learning speed of the artificial intelligence processor (not shown) and the artificial intelligence processing unit (not shown) of the central server (not shown) may also be faster.

Meanwhile, although a plurality of users may alternately use the interaction robot 100 according to an embodiment of the present invention, when the interaction robot 100 itself is considered as an independent possession, only a specific user needs to exclusively use the interaction robot. In this case, user authentication is necessarily required, and a step of performing authentication on a user (step S205) may be further included before step S210 of receiving a user input.

Here, although the user authentication may be accomplished through various methods, for example, any one method among authentication through the external device 200 linked to the interaction robot, voice authentication and face authentication, the authentication may be accomplished by touching a specific part of the interaction robot 100 as many as a preset specific number of times or by touching the interaction robot with a specific strength considering convenience and accuracy of the authentication and characteristics of the interaction robot 100. In this case, the interaction robot 100 should include a touch sensor (not shown) and a pressure sensor (not shown).

Meanwhile, the interaction robot 100 may be used in a comparatively wide space such as a public place, a company or the like, as well as at home, and in this case, a plurality of interaction robots 100 may be arranged to provide a service. In this case, since it is too troublesome to separately manage individual interaction robots 100, a manager may group the plurality of interaction robots 100 according to usage of the interaction robots 100 and collectively update the grouped interaction robot groups or collectively install applications in the interaction robot groups to pursue convenience of management. In this case, data and learning contents acquired by a certain interaction robot 100 in a group may be shared among other interaction robots 100 in the group.

Furthermore, when a new interaction robot is included in a previously formed group, the new interaction robot is automatically synchronized with the interaction robots 100 included in a corresponding group and may share the data and the learning contents, and when there are two or more groups of different usages and if it is preferable for an interaction robot belonging to a specific group to be included in another group, it may be induced to move the corresponding interaction robot 100 to another group.

The control method of the interaction robot 100 according to an embodiment of the present invention described until now may be implemented as a control server 1000 of an interaction robot including all the same technical features. In this case, the control server 1000 of the interaction robot may include a processor 10, a network interface 20, a memory 30, a storage 40 and a data bus 50 connecting these as shown in FIG. 11.

The processor 10 controls the overall operation of each configuration. The processor 10 may be any one among a central processing unit (CPU), a micro processer unit (MPU), a micro controller unit (MCU), and a processor of a form well-known in the field of the art to which the present invention belongs. In addition, the processor 10 may perform an operation with regard to at least one application or program for performing the control method of the interaction robot 100 according to an embodiment of the present invention.

The network interface 20 supports wired and wireless Internet communication of the interaction robot 100 and may also support other known communication methods. Accordingly, the network interface 20 may be configured to include a communication module according thereto.

The memory 30 stores various data, commands and/or information and may load one or more computer programs 41 from the storage 40 to perform the control method of the interaction robot according to an embodiment of the present invention. Although a RAM is shown in FIG. 1 as a kind of the memory 30, it is apparent that various storage media may be used as the memory 30, together with the RAM.

The storage 40 may non-temporarily store one or more of computer programs 41 and large-scale network data 42. The storage 40 may be any one among a non-volatile memory such as ROM (Read Only Memory), EPROM (Erasable Programmable ROM), EEPROM (Electrically Erasable Programmable ROM), flash memory or the like, a hard disk, a detachable disk, and a computer-readable recording medium of a certain type well-known in the field of the art to which the present invention belongs.

The computer program 41 is loaded on the memory 30 and includes an operation of receiving a user input by one or more processors 10, an operation of searching for and determining a robot response corresponding to the received user input, and an operation of outputting the determined robot response, and the operation of outputting the robot response may perform an operation of outputting a color matching to the received user input or the determined robot response to the light emitting unit, and an operation of outputting a motion matching to the received user input or the determined robot response to any one or more among the first driving unit and the second driving unit.

Meanwhile, the control method of the interaction robot according to an embodiment of the present invention may be implemented as a computer program stored in a medium including all the same technical features. Although it is not described in detail to avoid duplicated description, all the technical features of the control method of the interaction robot according to an embodiment of the present invention as described above may be equally applied to the computer programs stored in the medium and may derive the same effects according thereto.

Although the embodiments of the present invention have been described with reference to the accompanying drawings, those with ordinary knowledge in the field of the art to which the present invention belongs may understand that the present invention may be embodied in other specific forms without changing the technical spirit and essential features of the present invention. Therefore, the above-described embodiments are only exemplary, not restrictive from any standpoint.

What is claimed is:

1. A control method of an interaction robot, the method comprising the steps of:
    receiving a user input, by the interaction robot;
    determining a robot response corresponding to the received user input, by the interaction robot; and
    outputting the determined robot response, by the interaction robot,
    wherein the step of outputting the determined robot response includes the steps of:
    outputting a color matching to the received user input or the determined robot response to a light emitting unit, by the interaction robot; and
    outputting a motion matching to the received user input or the determined robot response to any one or more among a first driving unit and a second driving unit, by the interaction robot,
    wherein the step of determining the robot response includes the steps of:
    converting the received user input into a character string and separating the character string into words; and
    extracting an emotion matching to the separated words and a color matching to the emotion from an emotion classifier,
    wherein the emotion classifier has a plurality of words matched to an emotion and sorted in advance, periodically crawls data including a specific sentence, and matches, when a word other than the plurality of words matched to an emotion is included in the crawled specific sentence, an emotion to the word on the basis of the emotion matched to the other words included in the specific sentence.

2. The method according to claim 1, wherein the user input and the robot response are any one or more among a voice, a gesture, a facial expression, a touch, a USB input/output and an input/output through an external device linked to the interaction robot.

3. The method according to claim 1, wherein the step of outputting the robot response includes the steps of:
    converting the determined robot response into a character string and separating the character string into words; and
    extracting an emotion matching to the separated words and a color matching to the emotion from an emotion classifier.

4. The method according to claim 1, further comprising, before the step of receiving a user input, the step of performing authentication on a user, wherein
    the authentication on a user is performed by touching a specific part of the interaction robot as many as a preset specific number of times or by touching the interaction robot with a specific strength.

5. The method according to claim 1, wherein the interaction robot may operate as an Internet access point (AP) in a space where the interaction robot is arranged.

6. The method according to claim 1, further comprising, before the step of receiving a user input, the steps of:
    recognizing approach of a user; and
    outputting a leading question to receive the user input as approach of a user is recognized.

7. The method according to claim 1, wherein when a plurality of interaction robots is clustered, the interaction robots may be grouped into interaction robot groups according to usage by the user, and updates may be collectively performed on or applications may be collectively installed in the grouped interaction robot groups.

8. A control server of an interaction robot, the server comprising:
    one or more processors;
    a network interface;
    a memory for loading a computer program performed by the processors; and a
    storage for storing large-scale network data and the computer program,
    wherein the computer program includes an operation of receiving a user input;
    an operation of searching for and determining a robot response corresponding to the received user input; and
    an operation of outputting the determined robot response,
    wherein the operation of outputting the robot response includes
    an operation of outputting a color matching to the received user input or the determined robot response to a light emitting unit; and
    an operation of outputting a motion matching to the received user input or the determined robot response to any one or more among a first driving unit and a second driving unit,
    an operation of converting the received user input into a character string and separating the character string into words, and an operation of extracting an emotion matching to the separated words and a color matching to the emotion from an emotion classifier, wherein
    the emotion classifier has a plurality of words matched to an emotion and sorted in advance, periodically crawls data including a specific sentence, and matches, when a word other than the plurality of words matched to an emotion is included in the crawled specific sentence, an emotion to the word on the basis of the emotion matched to the other words included in the specific sentence.

* * * * *